United States Patent [19]

Kuck

[11] Patent Number: 5,664,846
[45] Date of Patent: Sep. 9, 1997

[54] HUBCAP WITH SHIELDED VENT

[75] Inventor: Scott M. Kuck, Lincoln, Nebr.

[73] Assignee: Dual Dynamics, Inc., Lincoln, Nebr.

[21] Appl. No.: 701,397

[22] Filed: Aug. 22, 1996

[51] Int. Cl.$^6$ .................................................. B60B 7/00
[52] U.S. Cl. .................................. 301/108.1; 301/108.4
[58] Field of Search ........................... 301/37.1, 108.1, 301/108.2, 108.3, 108.4

[56] References Cited

U.S. PATENT DOCUMENTS

| | | | |
|---|---|---|---|
| 2,576,610 | 11/1951 | Kunzog | 138/41 |
| 2,604,958 | 7/1952 | Leufvenius | 184/105 |
| 2,655,041 | 10/1953 | Jacobsson | 73/199 |
| 3,064,982 | 11/1962 | Stephens | 277/95 |
| 3,114,579 | 12/1963 | Isenbarger | 301/108 |
| 3,177,041 | 4/1965 | Isenbarger | 310/108 |
| 3,316,022 | 4/1967 | Isenbarger | 301/108 |
| 3,320,006 | 5/1967 | Cozzarin | 308/36.1 |
| 3,460,874 | 8/1969 | Johnson | 308/187.2 |
| 3,649,080 | 3/1972 | Molinare | 301/108 R |
| 3,783,590 | 1/1974 | Allen | 55/310 |
| 4,073,540 | 2/1978 | Jackowski | 301/106 |
| 4,295,868 | 10/1981 | Hölter et al. | 55/302 |
| 4,687,579 | 8/1987 | Bergman | 210/347 |
| 4,723,529 | 2/1988 | Yokoi et al. | 123/573 |
| 4,732,594 | 3/1988 | Mizrah et al. | 55/523 |
| 4,744,386 | 5/1988 | Frazer | 137/315 |
| 4,820,950 | 4/1989 | Hijiya et al. | 310/90.5 |
| 4,990,054 | 2/1991 | Janocko | 415/111 |
| 5,066,071 | 11/1991 | Kinser | 301/108 TW |
| 5,071,457 | 12/1991 | Schmidt, Jr. et al. | 55/523 |
| 5,087,278 | 2/1992 | Suzuki | 55/523 |
| 5,192,117 | 3/1993 | Kuck | 301/108.1 |
| 5,195,807 | 3/1993 | Lederman | 301/108.1 |
| 5,482,358 | 1/1996 | Kuck | 301/108.1 |

*Primary Examiner*—Russell D. Stormer
*Attorney, Agent, or Firm*—Zarley, McKee, Thomte, Voorhees & Sease; Dennis L. Thomte

[57] ABSTRACT

A hubcap for a wheel comprising a generally cup-shaped member adapted to be secured to a wheel and having a vent opening formed therein. A vent plug is positioned in the vent opening which permits the passage of air therethrough but which prevents the passage of water and contaminants therethrough. A grease shield is positioned at the inner surface of the end wall of the cup-shaped member for preventing grease or oil from coming into contact with the vent plug.

7 Claims, 3 Drawing Sheets

HUBCAP WITH SHIELDED VENT

BACKGROUND OF THE INVENTION

1. Field of the Invention

This invention relates to a hubcap and more particularly to a hubcap for use with automatic bearing lubrication systems and even more particularly to a hubcap having a shielded vent.

2. Description of the Related Art

Hubcaps are used on wheels of many trucks and trailers to prevent contaminants from entering the wheel bearings and for maintaining the oil or grease in the bearings. In recent years, Dual Dynamics, Inc. of Lincoln, Neb. has designed a hubcap having an automatic bearing lubrication system. The hubcap of Dual Dynamics, Inc. is known as a Dual-Guard™ hubcap and includes a hubcap which may be mounted on the studs of the truck or trailer wheel or threaded onto some types of axles. The interior of the Dual-Guard™ hubcap is filled with oil or grease so that the wheel bearings are lubricated. Heretofore, it has been necessary to provide a small vent opening in the Dual-Guard™ hubcap to permit the venting of excessive pressure within the hubcap as the bearings become heated. Although the vent openings work extremely well, they do pose a problem in certain situations. For example, in some dock loading situations, the wheels of the truck move downwardly into an excavated area adjacent the dock so that the bed of the truck will be level with the dock. In some cases, the excavated area adjacent the dock may be filled with water. Should the hubcaps of the truck wheels be submerged in the water, water and other contaminants may enter the interior of the hubcap through the vent opening. The water and contaminants may dramatically shorten the life of the wheel bearings, hub and axle of the truck.

The problems associated with the prior art were solved by way of the disclosure in U.S. Pat. No. 5,192,117 wherein a hubcap is described which includes a vent opening having a plug positioned therein which is comprised of a bronze powder material cast into a cylindrical shape and press-fitted into the vent opening to permit the continuous passage of air therethrough to vent the wheel to vent the wheel bearings, but which prevented the passage of water and other contaminants therethrough. Although the bronze powder material used in the vent of the '117 patent is the preferred embodiment, it has been found that other materials having certain characteristics will also serve the intended purpose. Although the bronze material of plug 36 in U.S. Pat. No. 5,192,117 did perform its intended function, it was found that other materials will work, providing the plug 36 is manufactured from a porous material in which the material, particle size, porosity, pore size, pore shape, tortuosity and interconnection of the pores is such that the plug will readily allow the passage of gasses, but will not allow the passage of fine debris and liquid such as water.

Even though the vents disclosed hereinabove could satisfactorily perform, it has been found that the grease or oil in the bearings tends to come into contact with the inner end of the vent plug and may restrict the flow of air or gasses therethrough.

It is therefore a principal object of the invention to provide an improved hubcap having a shielded vent provided therein.

A further object of the invention is to provide a hubcap having a vented opening formed therein which is filled with a cylindrical plug which permits air to pass therethrough to vent the hubcap, but which prevents water and other contaminants from passing therethrough, with the plug having a shield positioned at its inner end to prevent grease from coming into contact therewith.

These and other objects will be apparent to those skilled in the art.

SUMMARY OF THE INVENTION

Figure 1:
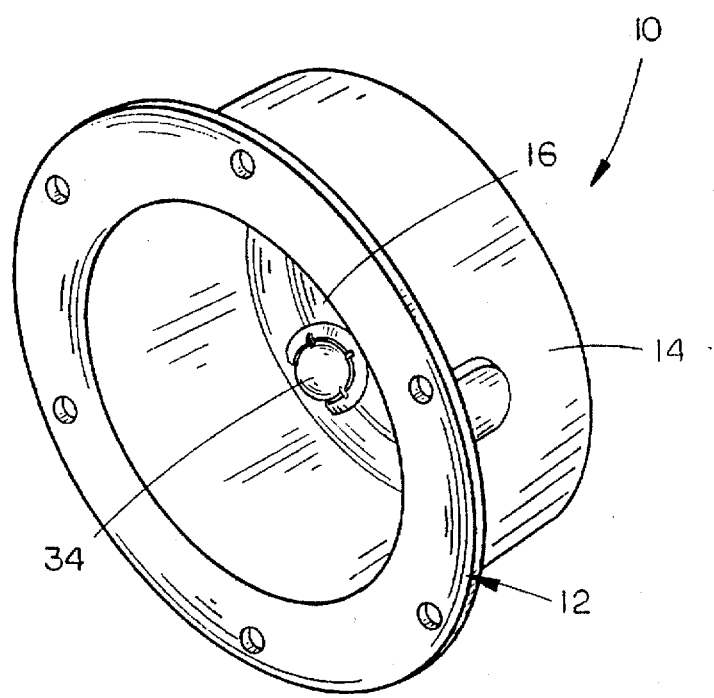
FIG. 1 is an inner perspective view of the hubcap of this invention.
Figure 2:
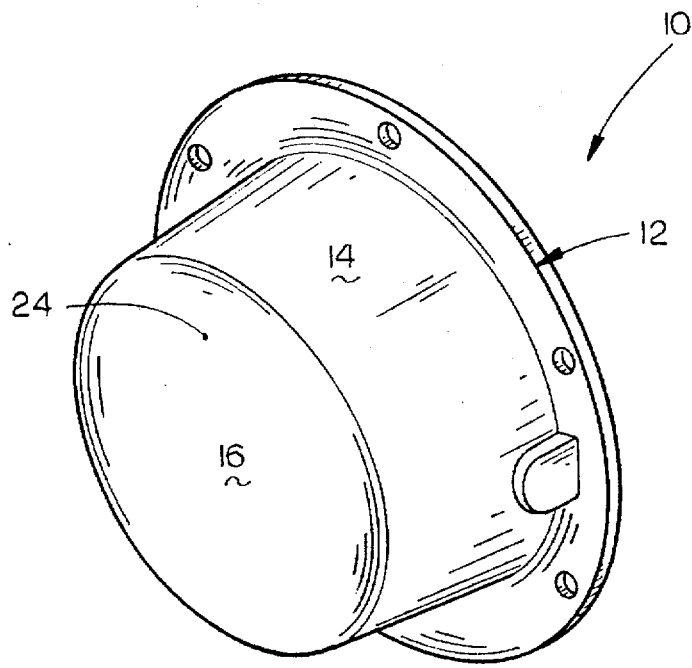
FIG. 2 is an outer perspective view of the hubcap of this invention.

A hubcap is provided for a truck or a trailer and which is designed to contain grease or the like therein so that the bearings of the associated wheel are lubricated. In the hubcap of this invention, a small vent opening is provided which is filled with a cylindrical vent plug which permits air to pass therethrough, but which prevents water and other contaminants from passing therethrough. A shield is positioned at the inner surface of the hubcap to prevent grease and/or oil from coming into contact with the inner end of the vent plug.

DESCRIPTION OF THE PREFERRED EMBODIMENT

The hubcap of this invention is referred to generally by the reference numeral 10 and is seen to be generally cup-shaped. For purposes of description, hubcap 10 will be described as including a mounting flange 12, a cylindrical side wall or skirt 14 and an end wall 16. For purposes of description also, end wall 16 will be described as having an inner surface 18 and an outer surface 20.

Figure 3:
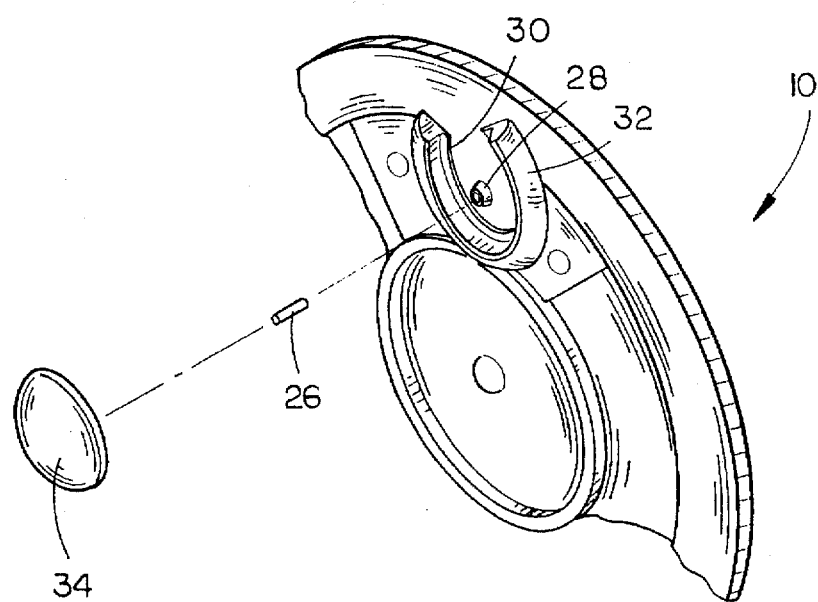
FIG. 3 is a partial exploded perspective view of the hubcap of this invention.
Figure 4:
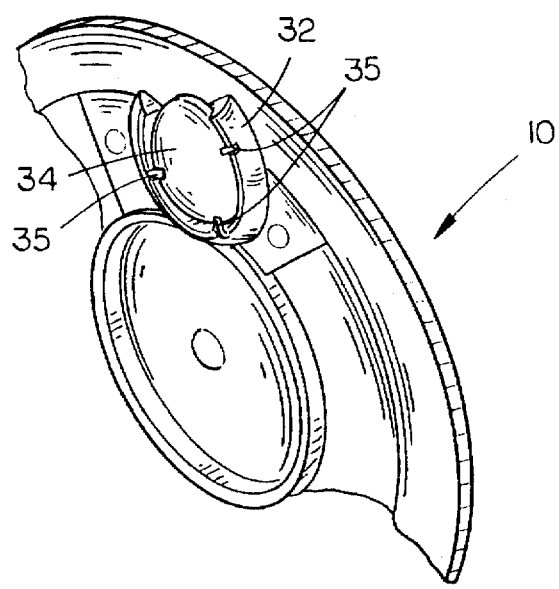
FIG. 4 is a perspective view illustrating the shield of the invention in position.
Figure 5:
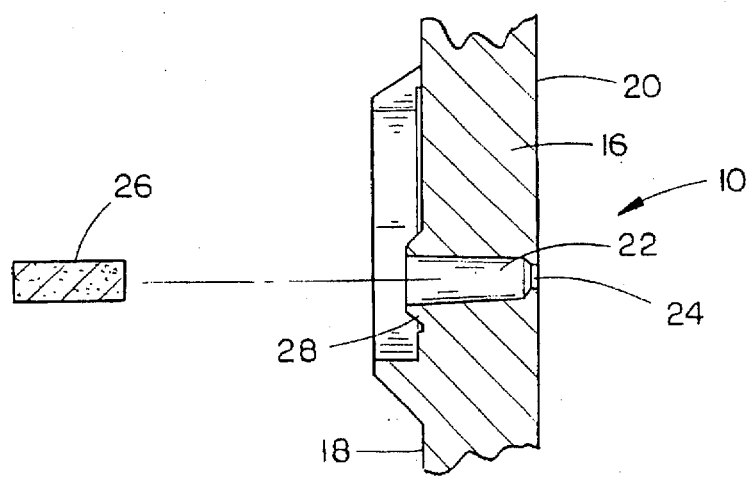
FIG. 5 is a partial sectional view illustrating the vent plug being inserted into the hubcap.
Figure 6:
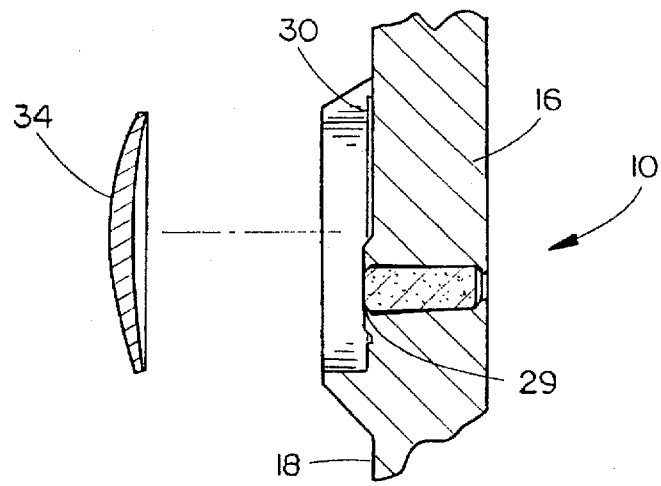
FIG. 6 is a view similar to FIG. 5 except that the vent plug has been installed and staked therein and which also shows the shield of the invention.

A tapered vent opening 22 extends through end wall 16 and has a reduced diameter outer end 24 to prevent the vent plug 26 from moving outwardly from vent opening 22. Vent opening 22 is tapered as described to facilitate the insertion of the vent plug 26 therein from the inner end thereof. In the preferred composition of the vent plug in U.S. Pat. No. 5,192,117, the plug was comprised of a bronze powder material cast into a cylindrical plug form. One type of bronze powder material that will function properly in this environment is manufactured by Avenger Metals North, Inc. and which is generally referred to as a 90 P spherical bronze material. Other types of materials will work as a vent plug wherein the material, particle size, porosity volume, pore size, pore shape, tortuosity and interconnection of the pores is such that the plug will readily allow the passage of gasses, but will not allow the passage of fine debris and liquid such as water. As seen in FIGS. 3 and 5, the inner surface of end wall 16 is provided with a small annular ridge 28 extending around vent opening 22. After plug 26 has been inserted into vent opening 22, the ridge 28 is deformed or "staked" over the inner end of plug 26 to maintain plug 26 in vent opening 22, as seen in FIG. 6. For purposes of description, the deformed areas will be indicated by the reference numeral 29.

A semi-circular disc support 30, preferably 270°, is provided on the inner surface 18 of end wall 16 around vent opening 22 and preferably protrudes approximately 0.015 inch from the inner surface 18. The numeral 32 refers to a semi-circular disc retainer which extends around disc support 30 and which also protrudes inwardly from inner surface 18 of end wall 16. Preferably, disc retainer 32 also has an arc of 270° and is integrally formed with disc support 30.

The numeral 34 refers to a disc-shaped grease shield which is slightly domed and which is adapted to be positioned on disc support 30. After shield 34 has been placed on disc support 30, the retainer 32 is deformed or staked over the inner peripheral surface of shield 34 to maintain shield 34 on support 30. The deformed areas are identified by the reference numeral 35.

Figure 7:
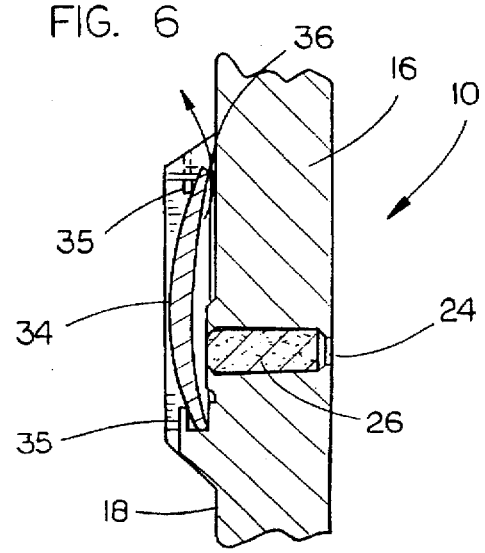
FIG. 7 is a partial sectional view illustrating the shield in position with the arrow indicating the movement of air or gas.

The hubcap is then filled with oil or grease and installed on the wheel. In many situations, the hubcap is first installed on the wheel and the grease or oil is then inserted into the hubcap. The disc-shaped grease shield 34, due to its slightly domed configuration, provides a small amount of space or clearance between the grease shield 34 and the vent plug 26, as seen in FIG. 7. The semi-circular disc support 30 also aids in providing the clearance between the grease shield 34 and the vent plug 26. The fact that the disc support 30 is not continuous but has only an arc of 270° provides an opening 36 which has a height of 0.015 inch. Opening 36 is such that it prevents oil and grease from passing therethrough, but permits air or gasses to pass therethrough. The vent plug 26 permits air and gasses to pass therethrough, but prevents debris and liquid from passing therethrough.

Thus it can be seen that a novel grease shield has been provided which is positioned over the inner end of the vent plug to prevent grease or oil from coming into contact with the inner end of the vent plug so that the vent plug will properly function. The grease shield of this invention, while preventing grease or oil from coming into contact with the vent plug, permits the passage of air or gasses therethrough by way of the opening 36.

Thus it can be seen that the above-described invention accomplishes at least all of its stated objectives.

I claim:

1. A hubcap for a wheel comprising:

a generally cup-shaped member adapted to be secured to a wheel to prevent contaminants from entering the wheel bearings of the wheel;

said cup-shaped member including a generally cylindrical side wall having inner and outer ends, and an end wall at the outer end thereof;

said end wall having inner and outer surfaces;

said end wall having a vent opening formed therein having inner and outer ends;

a vent plug positioned in said vent opening which permits the passage of air therethrough to vent the wheel bearings, but which prevents the passage of water and contaminants therethrough;

and a grease shield positioned at said inner surface of said end wall for preventing grease from coming into contact with said plug means;

a semi-circular support on said inner surface of said end wall which partially extends around said inner end of said vent opening and which protrudes inwardly from said inner surface of said end wall;

and a disc-shaped grease shield positioned on said semi-circular support for preventing grease from coming into contact with said plug means in said vent opening.

2. The hubcap of claim 1 wherein said support protrudes approximately 0.015 inch from said inner surface of said end wall so that a portion of the periphery of said grease shield will be spaced from said inner surface to said end wall to permit the passage of air therebetween.

3. The hubcap of claim 1 wherein a semi-circular disc retainer extends around said support for maintaining said grease shield on said support.

4. The hubcap of claim 3 wherein said retainer is deformed into engagement with said grease shield.

5. The hubcap of claim 1 wherein said disc-shaped grease shield is domed to provide clearance between the inner end of said plug means and said grease shield.

6. The hubcap of claim 1 wherein said plug means is cylindrical and is staked into said vent opening.

7. The hubcap of claim 1 wherein the outer end of said vent opening has a smaller diameter than the diameter of said plug means.

* * * * *